(12) United States Patent
Hessenberger

(10) Patent No.: US 12,017,778 B2
(45) Date of Patent: Jun. 25, 2024

(54) CUSHION FOR A PLANE SEAT, HAVING ANTIMICROBIAL EFFECT

(71) Applicant: NEVEON Austria GmbH, Kremsmünster (AT)

(72) Inventor: Norbert Hessenberger, Ohlsdorf (AT)

(73) Assignee: NEVEON Austria GmbH, Kremsmünster (AT)

( * ) Notice: Subject to any disclaimer, the term of this patent is extended or adjusted under 35 U.S.C. 154(b) by 330 days.

(21) Appl. No.: 17/442,716

(22) PCT Filed: Mar. 17, 2020

(86) PCT No.: PCT/EP2020/057240
§ 371 (c)(1),
(2) Date: Sep. 24, 2021

(87) PCT Pub. No.: WO2020/193276
PCT Pub. Date: Oct. 1, 2020

(65) Prior Publication Data
US 2022/0185483 A1   Jun. 16, 2022

(30) Foreign Application Priority Data

Mar. 25, 2019   (DE) ..................... 10 2019 204 044.6

(51) Int. Cl.
*B64D 11/06* (2006.01)
*D06M 11/74* (2006.01)
(Continued)

(52) U.S. Cl.
CPC ......... *B64D 11/0647* (2014.12); *D06M 11/74* (2013.01); *D06M 13/352* (2013.01);
(Continued)

(58) Field of Classification Search
CPC .......... B64D 11/0647; D06M 2200/30; D06M 2200/35; D06M 16/00; D06M 11/74
See application file for complete search history.

(56) References Cited

U.S. PATENT DOCUMENTS 4,865,906 A * 9/1989 Smith, Jr. .............. D02G 3/443
428/374
6,211,258 B1   4/2001 Eling
(Continued)

FOREIGN PATENT DOCUMENTS

DE     69719779 T2    10/2003
DE    202011110323 U1   7/2013
(Continued)

OTHER PUBLICATIONS

Dagostin et al., "Bactericidal polyurethane foam mattresses: Microbiological characterization and effectiveness", Materials Science and Engineering, 2010, pp. 705-708, vol. 30, No. 5.
(Continued)

*Primary Examiner* — Timothy J Brindley
(74) *Attorney, Agent, or Firm* — The Webb Law Firm

(57) ABSTRACT

Provided is a cushion for an aircraft seat including at least one antimicrobially active pad made of at least one plastic material, the pad having at least two antimicrobially active substances contained therein. The antimicrobially active substances do not contain silver or silver ions, and at least one antimicrobially active flame retardant fabric covering side at least one pad.

20 Claims, 2 Drawing Sheets

(51) Int. Cl.
*D06M 13/352* (2006.01)
*D06M 16/00* (2006.01)

(52) U.S. Cl.
CPC ........ *D06M 16/00* (2013.01); *D06M 2200/30* (2013.01); *D06M 2200/35* (2013.01)

(56) References Cited

U.S. PATENT DOCUMENTS

| | | | |
|---|---|---|---|
| 6,528,002 B1 | 3/2003 | Wensel et al. | |
| 6,733,083 B1 | 5/2004 | Landvik et al. | |
| 9,585,492 B2 | 3/2017 | Bolliou | |
| 11,584,105 B2* | 2/2023 | Hessenberger | B32B 5/26 |
| 2002/0182967 A1 | 12/2002 | Erb, Jr. et al. | |
| 2007/0210629 A1 | 9/2007 | Berge | |
| 2009/0068412 A1 | 3/2009 | Nahmias et al. | |
| 2010/0330275 A1* | 12/2010 | Panse | B32B 27/12 |
| | | | 427/230 |
| 2011/0104466 A1* | 5/2011 | Atkinson | D01G 25/00 |
| | | | 442/199 |
| 2011/0165397 A1* | 7/2011 | Roe | D04H 1/435 |
| | | | 442/403 |
| 2011/0207379 A1* | 8/2011 | Henkes | B60N 2/58 |
| | | | 442/1 |
| 2011/0319261 A1 | 12/2011 | Innerlohinger et al. | |
| 2012/0003456 A1 | 1/2012 | Marchgraber et al. | |
| 2012/0171269 A1 | 7/2012 | Kostak | |
| 2013/0341979 A1 | 12/2013 | Girard | |
| 2014/0171528 A1 | 6/2014 | Kim et al. | |
| 2014/0171529 A1 | 6/2014 | Kim et al. | |
| 2014/0171531 A1 | 6/2014 | Kim et al. | |
| 2016/0129819 A1 | 5/2016 | Johnson, Jr. et al. | |
| 2018/0027987 A1 | 2/2018 | Calhoun et al. | |
| 2019/0153145 A1 | 5/2019 | Tang et al. | |
| 2021/0114332 A1 | 4/2021 | Hessenberger | |
| 2021/0254278 A1* | 8/2021 | Honig | D06M 13/513 |

FOREIGN PATENT DOCUMENTS

| | | | |
|---|---|---|---|
| DE | 102013011033 A1 | 12/2014 | |
| EP | 0155155 A2 | 9/1985 | |
| EP | 1058629 B1 | 1/2005 | |
| EP | 2263464 A1 | 12/2010 | |
| EP | 2389408 B1 | 8/2016 | |
| EP | 3202806 A1 | 8/2017 | |
| EP | 2613927 B1 | 1/2019 | |
| JP | 2009120994 A * | 6/2009 | |
| NL | 1033695 C2 | 10/2008 | |
| WO | 0100720 A1 | 1/2001 | |
| WO | WO-2005024119 A1 * | 3/2005 | B32B 27/12 |
| WO | 2010083547 A2 | 7/2010 | |
| WO | 2010088157 A1 | 8/2010 | |
| WO | 2012024097 A1 | 2/2012 | |
| WO | 2012135888 A1 | 10/2012 | |
| WO | 2014206570 A1 | 12/2014 | |
| WO | 2015194292 A1 | 12/2015 | |
| WO | WO-2017144662 A1 * | 8/2017 | B60N 2/70 |
| WO | 2018177808 A1 | 10/2018 | |
| WO | WO-2020234115 A1 * | 11/2020 | B60N 2/4242 |

OTHER PUBLICATIONS

"Ultra-Fresh DW-30" Product information [online]. Thomson Research Associates Inc., 2017, pp. 1-2 [retrieved on Dec. 19, 2021]. Retrieved from the Internet: <URL: https://ergocontrol.es/images/pdfs/ultra-fresh-dw-30-pis.pdf>.

* cited by examiner

CUSHION FOR A PLANE SEAT, HAVING ANTIMICROBIAL EFFECT

CROSS-REFERENCE TO RELATED APPLICATIONS

This application is the United States national phase of International Application No. PCT/EP2020/057240 filed Mar. 17, 2020, and claims priority to German Patent Application No. 10 2019 204 044.6 filed Mar. 25, 2019, the disclosures of which are hereby incorporated by reference in their entirety.

BACKGROUND OF THE INVENTION

Field of the Invention

The present invention relates to a cushion for an aircraft seat with antimicrobially active substances and to an aircraft seat with such a cushion.

Description of Related Art

Aircraft manufacturers and their suppliers, as well as airlines, are interested in constantly improving passenger safety, comfort and health. Aircraft seats and the associated seat cushions play a crucial role in this.

The conventionally used cushions, such as seat cushions consist essentially of foams. In most cases, the foams are in contact with the body, usually separated only by one or more intermediate textile layers. Most foams are made of synthetic polymers such as polyurethane, polystyrene, synthetic rubber, which absorb moisture such as body perspiration to a certain extent.

As a result, over time, a climate favorable for the growth of bacteria and other undesirable microbes, such as mites, is formed in the foams. Accordingly, bacterial growth may occur in the pillows, and it is difficult to eliminate them.

One way to counteract this is to use covers with antimicrobial properties. For example, US 2013/0341979 A1 describes a cushion device for attachment to an armrest of an aircraft seat. The cushion has a cover made of antimicrobial polyester or nylon.

Antimicrobial additives can also be added to the textile covers. In the past, substances containing silver and/or zinc were preferably used as antimicrobial additives. US 2012/0171269 A1 discloses a cover for various seats containing silver or copper in the form of nanoparticles.

It is also known to add silver salts directly into foams during the manufacturing process, thus incorporating the silver salts into the foam matrix and creating antibacterial or antifungal properties of the foam. The incorporation of silver into the foam can be in the form of ions or nanoparticles. It is also known to incorporate silver-containing fibers into a cushion material (WO 2015/194292 A1).

SUMMARY OF THE INVENTION

However, the antimicrobial substances such as silver lose their effectiveness over time. The disposal of such chemically contaminated foams can also be a problem.

The proposed solution is now based on the object of providing a cushion for an aircraft seat which has improved antimicrobial effectiveness compared with known designs and thus contributes to improved hygiene in aircraft and thus to improved passenger well-being. The cushion must also comply with the safety precautions required in aircraft, particularly with regard to fire protection.

This object is solved with a cushion for an aircraft seat having features as described herein.

Accordingly, a cushion, such as seat cushions, back cushions, head cushions, leg rests, arm rests as well as cushion combinations for reclining applications, for an aircraft seat is provided, wherein the cushion comprises:

at least one antimicrobially active pad of at least one plastic material, wherein at least two antimicrobially active substances are contained in the pad, wherein the antimicrobially active substances do not contain silver or silver ions, and at least one antimicrobial flame retardant fabric covering the at least one pad.

A cushion, such as a seat cushion, with antimicrobial properties is thus provided. The antimicrobial substances are incorporated directly into the cushion and are thus an integral part of the cushion.

The present pillow not only has improved antibacterial and antifungal efficacy, but is also capable of absorbing, retaining and quickly releasing moisture. Due to the plastic used as foam, the present pillow also has high air permeability and elasticity. In addition, the present pillow meets the requirements of health (no substances harmful to human health), stability and fire safety.

In one embodiment of the present pad, at least one antimicrobially active substance is at least one thiabendazole (TBZ), in particular 2-(4-thiazolyl)-1H-benzimidazole.

The at least one thiabendazole is present in the cushion in an amount between 5 and 25 wt %, preferably between 10 and 20 wt %, more preferably between 12 and 18 wt %, most preferably 15 wt %.

In another embodiment of the present pad, another antimicrobially active substance is at least one pyrithione.

Pyrithione is a natural plant product of the Asian onion (*Allium stipitatum*). The dipyrithione disulfide (2,2'-disulfanediylbis(pyridine)-1,1'-dioxide) was also found in this plant. Sodium pyrithione is used as an antifungal agent. Dipytithione is effective as a bactericide and funficide.

Preferably, zinc pyrithione is used. Here, the pyrithine anion acts as a monodentate or bidentate ligand and forms a 1:2 complex with a zinc(II) center The complex is also referred to as bis(1-hydroxy-2(1H)-pyridinethionato-O,S) Zn.

The at least one pyrithione is contained in the pad in an amount between 5 and 25 wt %, preferably between 10 and 20 wt %, more preferably between 12 and 18 wt %, most preferably 15 wt %.

In a particularly preferred embodiment of the present pad, a combination of at least one thiabendazole and at least one pyrithione is used.

In a further embodiment of the present cushion, the two antimicrobially active substances are used in the cushion in a weight ratio of between 1:5 and 5:1, preferably between 1:3 and 3:1 more preferably between 1:2 and 2:1, m most preferably 1:1.

The cushion used in the present cushion is made of a plastic foam, preferably polyurethane foam, polyurethane-graphite foam, polyethylene foam, polystyrene foam, polycarbonate foam, polyether foam, polyester foam, PVC foam, silicone foam, or PMMA (polymethyl methacrylate) foam. Preference is given to the use of a cushion made of an (open-cell) polyurethane foam.

The cushion may comprise one or more foam layers or foam sheets. In the case of a multilayer pad, the different foam layers may have different strengths or stiffnesses that are adjustable during foam production.

Polyurethane foams are typically prepared from an isocyanate or a mixture of at least two isocyanates, such as toluene-2,4-di isocyanate (TDI) or diphenylmethane diisocyanate (MDI), optionally used as prepolymer, and a polyol or a mixture of several polyols, for example a polyether polyol or a polyester polyol, and water as base components. The at least one isocyanate and the at least one polyol are preferably added in such a proportion that a ratio of the functional groups —NCO/—OH is set in a range between 0.20:1, in particular 0.85:1 and 0.95:1, in particular 1.2:1.

Preferably, the antimicrobially active substances are incorporated into the foam during foam production. For this purpose, the mixture of the at least one thiabendazole and the at least one pyrithione is introduced in a dispersion. The dispersion of pyrithione and thiabendazole can be added to the polyol component before polymerization. This allows a very good distribution of the antimicrobially active substances in the foam matrix. For these purposes, the dispersion used, which is insoluble in water, may contain a solvent carrier, in particular a phthalate-free plasticizer. The amount of volatile organic components in this dispersion is between 3 and 5%, preferably 4%. This dispersion is added in an amount between 0.1-0.7%, preferably between 0.3-0.4% in relation to the amount of polyol in the foam production.

Further additives, such as a catalyst or activator, defoamers, colorants can be added. Color pigments, such as titanium oxides, in particular titanium dioxide, barium sulfate, ion exchangers, polyethylene, polypropylene, polyester, activated carbon, expandable graphite, polymer superabsorbents for moisture absorption and flame retardants can be used as additives.

In general, it should be noted that the addition of antimicrobial substances to the upholstery foam produces a new type of foam that must meet the specific requirements for foams in the aircraft industry. A simple transfer of properties from one foam to another is not possible in the aircraft industry. In particular, the strict requirements for the fire behavior of foams in the aircraft industry must be met.

As described, the at least one pad is covered by at least one flame retardant fabric comprising a nonwoven or woven fabric.

The presently used antimicrobially effective and abrasion-resistant flame retardant fabric comprises at least one barrier layer of at least one nonwoven fabric of at least one type of flame-resistant fiber, and at least one abrasion-resistant layer (abrasion layer) provided on the barrier layer of at least one textile fabric with high abrasion resistance of at least one type of fiber, preferably at least two types of fiber.

The at least one abrasion layer used in the present flame protection fabric has an abrasion resistance of at least 30,000 cycles, preferably of at least 45,000 cycles, in particular of at least 55,000 cycles, very particularly preferably of at least 150,000 cycles. The abrasion resistance is determined according to Martinedale DIN ISO 12947 1; BS 5960; 1988. In the test procedure according to Martindale, cotton is used as the standard material. The required level of abrasion resistance of the flame retardant fabric is influenced by the intended use. For example, the abrasion resistance depends on the aircraft structure, e.g. seat bottom shell or fabric (diaframe) or backrest structure, in or on which the flame retardant fabric is used. The aim is to provide a flame protection fabric that can be used for all aircraft structures.

The high abrasion resistance of the textile fabric used for the abrasion layer is due in particular to a large tight mesh and small fiber spacing of the fibers used in the textile fabric. Accordingly, the tensile strength of the textile fabric used for the abrasion layer is in a range between 700 and 1200 N/25 mm, preferably between 800 and 1100 N/25 mm, in particular preferably between 850 and 1000 N/25 mm in the longitudinal direction and in a range between 400 and 800 N/25 mm, preferably between 500 and 700 N/25 mm, in particular preferably between 500 and 600 N/25 mm in the transverse direction. The tensile strength is determined according to DIN 53357-A using a 25 mm wide strip.

The textile material used as the abrasion layer can be a woven, a knitted or a crocheted fabric. It is preferred if the textile fabric used has the same appearance on the front and the reverse side.

In the present context, a woven fabric is understood to be a flat textile fabric consisting of at least two thread systems crossed at right angles or almost at right angles, the threads running in the longitudinal direction being referred to as warp threads and the threads running in the transverse direction being referred to as weft threads. The yarns pass over and under the transverse yarns in a certain rhythm (weave). In the fabric used as an abrasion layer, one fiber in the warp direction and one fiber in the weft direction are adjacent to each other. This results in a high degree of tightness.

A knitted fabric and a crocheted fabric, on the other hand, are knitted fabrics and are made from thread systems by forming stitches, whereby one loop of thread is looped into another loop of thread. In the case of a crocheted fabric, one loop is made next to the other, i.e. the yarn runs horizontally; while in the case of a knitted fabric, the yarn forms superimposed loops, i.e. the yarn runs vertically. Here, too, a small distance between the fibers results in a high degree of tightness.

In one embodiment, the type of fiber used in the abrasion layer may comprise synthetic or natural fibers.

Polymer fibers selected from the group of polyacrylonitrile fibers (PAN fibers), preoxidized PAN fibers, polyaramide fibers, such as para-aramid fibers (Kevlar) or meta-aramid fibers (Nomex), kynol novoloid or carbon fibers can be used as synthetic fibers. Flame retardant equipped fibers can also be used. Preferred fibers are para-aramid fibers (or alternatively meta-aramid fibers) and polyacrylonitrile fibers (PAN fiber). Flame retardant seed fibers such as cotton fibers or flame retardant bast fibers such as hemp fibers can be used as natural fibers.

In a further embodiment of the present flame retardant fabric, the abrasion layer may also comprise more than one type of fiber. Preferably, two, three or four different fiber types are used, whereby fiber type and fiber proportions can be combined and varied as desired. In a preferred embodiment, only two fiber types are used, with poly-aramid fibers and polyacrylonitrile (PAN) fibers being preferred.

Thus, in the case of the use of two types of fibers in the abrasion layer, the quantitative proportions in each case can vary arbitrarily in a range between 5 and 95 wt %, preferably between 10 and 90 wt %, particularly preferably between 20 and 80 wt %.

In one variant, the abrasion layer can comprise
50 to 90% by weight, preferably 60 to 80% by weight, particularly preferably 70% by weight of a first type of fiber, and
10 to 50% by weight, preferably 20 to 40% by weight, particularly preferably 30% by weight of a second type of fiber.

In a particularly preferred embodiment of the present flame retardant fabric, the at least one abrasion layer comprises 50 to 90 wt %, preferably 60 to 80 wt %, more preferably 70 wt % polyacrylonitrile (PAN) fibers, and 10 to 50 wt %, preferably 20 to 40 wt %, more preferably 30 wt % para-aramid fibers.

In another preferred embodiment of the present flame retardant fabric, the at least one abrasion layer has a basis weight between 100 and 180 g/m$^2$, preferably between 110 and 150 g/m$^2$, more preferably between 130 and 140 g/m$^2$.

In general, it is conceivable and possible to use more than one textile layer as an abrasion layer, e.g. two, three or four.

The thickness of the abrasion layer is in a range between 0.2 and 1 mm, preferably 0.4 to 0.8 mm, in particular 0.5 mm.

As mentioned above, the abrasion layer may comprise or consist of a fiber blend of fibers based on, for example, polyaramides (especially para-aramid) and polyacrylonitrile.

Polyaramides (aromatic polyamides) are polyamides in which the amide groups are attached to aromatic groups. Aramides belong to the liquid crystal polymers (LCP). The most important types are poly(p-phenylene terephthalamide) (PPTA, trade names: Kevlar, Twaron) and poly(m-phenylene isophthalamide) (PMPI, trade names: Nomex, Teijinconex).

Polyacrylonitrile fibers (PAN fibers) typically consist of 100% polyacrylonitrile. PAN fibers are hard, stiff, resistant to chemicals and solvents, and have a melting point above the decomposition temperature. Copolymer fibers can also be used, which consist of polyacrylonitrile (proportion >85%) and polymethyl methacrylate.

The at least one abrasion layer is preferably applied continuously over the entire surface of the at least one barrier layer as part of the flame retardant fabric, and is thus preferably not in the form of a grid or scrim.

As noted above, the at least one barrier layer comprises at least one nonwoven fabric of at least one type of flame-resistant fiber.

Nonwovens (or nonwovens) are structures made of fibers of limited length, continuous fibers (filaments) or chopped yarns of any kind and origin, which have been joined together in some way to form a nonwoven (a fiber layer, a fiber pile) and bonded together in some way, excluding interlacing or entangling of yarns, as occurs in weaving, knitting (see above). Nonwovens are for the most part flexible textile fabrics, i.e. they are easily bendable, their main structural elements are textile fibers and they have a comparatively small thickness compared to their length and width.

In the present case, the fibers of the nonwoven used as a barrier layer are needled and then smoothed, or calendered (or pressed or ironed between two rollers).

In one embodiment, the type of fiber used in the barrier layer may comprise synthetic or natural fibers. Preferably, the barrier layer comprises synthetic fibers in the form of polymer fibers selected from the group of polyacrylonitrile fibers (PAN fiber), preoxidized PAN fibers, acrylonitrile fibers (e.g. Pyrotex), polyaramide fibers, kynol novoloid, para-aramide (Kevlar), meta-aramide (Nomex), basalt fiber, polysilicic acid (SIALOXOL compounds), carbon fiber are used.

In a further embodiment of the present flame retardant fabric, the barrier layer may also comprise more than one type of fiber. Preferred are two, three or four different fiber types, whereby fiber type and fiber proportions can be combined and varied as desired.

Thus, in the case of the use of two types of fibers in the barrier layer, the quantitative proportions can each vary arbitrarily in a range between 5 and 95% by weight, preferably between 10 and 90% by weight, particularly preferably between 20 and 80% by weight.

In the case of using three types of fibers, the quantitative proportions can be as follows:

50 to 90 wt %, preferably 60 to 80 wt %, more preferably 70 wt % of a first type of fiber, 5 to 30% by weight, preferably 10 to 20% by weight, more preferably 15% by weight of a second type of fiber, and 5 to 30 wt %, preferably 10 to 20 wt %, more preferably 15 wt % of a third type of fiber.

In a particularly preferred embodiment of the present flame retardant fabric, the at least one barrier layer comprises 50 to 90 wt %, preferably 60 to 80 wt %, more preferably 70 wt % acrylonitrile fibers (such as Pyrotex fiber), 5 to 30% by weight, preferably 10 to 20% by weight, more preferably 15% by weight para-amide fibers, and 5 to 30 wt %, preferably 10 to 20 wt %, more preferably 15 wt % pre-oxidized polyacrylonitrile (preox PAN) fibers.

In another preferred embodiment of the present flame retardant fabric, the at least one barrier layer has a basis weight between 50 and 150 g/m$^2$, preferably between 60 and 120 g/m$^2$, more preferably between 70 and 100 g/m$^2$.

The thickness of the barrier layer is between 0.7 and 1.3 mm, preferably between 0.9 and 1.2 mm, more preferably between 1.0 and 1.2 mm.

Also in the case of the barrier layer, it is generally conceivable and possible to use more than one nonwoven layer as a barrier layer, e.g. two, three or four.

As mentioned above, the barrier layer may consist of a fiber blend of acrylonitrile-based fibers (such as Pyrotex), pre-oxidized polyacrylonitrile fibers, and para-aramid fibers.

Pyrotex fibers are flame resistant fibers based on acrylonitrile. Pyrotex fibers are characterized by high acid/base resistance; UV resistance, solvent, hydrolysis and oxidation resistance and continuous temperature resistance up to max. 250'C.

Pre-oxidized polyacrylonitrile fibers (preox PAN fiber) are oxidized PAN fibers with a very high flame resistance.

The present flame retardant fabric is free from fillers, such as inorganic fillers, or other additives. In addition, it has no silicone coating or similar, as often used in the past.

In another preferred embodiment, the present flame retardant fabric comprises at least one intumescent layer. In the context of the solution, the term intumescence refers to an expansion or swelling, i.e., an increase in volume, of a solid body or material. Intumescent materials increase in volume and correspondingly decrease in density when exposed to heat.

In the case of the present flame retardant fabric, the at least one intumescent layer consists of expanded graphite, carbon or suitable flame retardant fibers.

The use of exfoliated graphite as an intumescent layer is particularly preferred. Expanded graphite, also known as expandable graphite, is produced from the naturally occurring mineral graphite. A graphite flake consists of layers of carbon atoms arranged in a honeycomb pattern. Within the layers, the atoms are very tightly bonded by covalent bonds. Only weak bonding forces prevail between the layers, so that molecules can be intercalated between the graphite layers. The intercalation of acids, usually sulfuric acid, converts graphite into exfoliated graphite. When exfoliated graphite is heated, the graphite flakes expand to many times their original volume, depending on the quality, starting at a temperature of approx. 140'C, and presently at approx. 180° C. The evaporation of the incorporated compounds causes the graphite layers to expand in an accordion-like manner. The expanded flakes have a "worm-like" appearance and are usually several millimeters long. One of the main applications of exfoliated graphite is flame retardancy. When exposed to heat, the exfoliated graphite expands and forms an intumescent layer on the surface of the material. This slows fire spread and counteracts the most dangerous fire consequences for humans, namely the formation of toxic gases and smoke.

The at least one intumescent layer is preferably provided on between the abrasion layer and the barrier layer as an intermediate layer.

In the case of using exfoliated graphite as an intumescent layer, the exfoliated graphite is first introduced into a suitable binder. The abrasion layer is then coated with this solution or suspension.

The at least one exfoliated graphite layer has a basis weight between 30 and 110 $g/m^2$, preferably between 40 and 100 $g/m^2$, more preferably between 50 and 80 $g/m^2$.

The thickness of the exfoliated graphite layer is between 0.1 and 0.3 mm, preferably between 0.1 and 0.2 mm.

In a particularly preferred embodiment, the present flame retardant fabric comprises at least one abrasion layer in the form of a knitted fabric or woven fabric having more than 30,000 cycles of abrasion resistance, at least one intumescent layer in the form of expanded graphite, carbon or various flame retardant fibers, and at least one barrier layer in the form of a needle flow of flame resistant materials.

The layer structure of the present flame retardant fabric is in a preferred variant (seen from top to bottom): abrasion layer-intumescent layer-barrier layer.

The total thickness of the flame protection fabric used in the present case is in a range between 1.5 and 2.5 mm, preferably between 1.8 and 2.0 mm, with a total weight between 200 and 300 g, preferably between 220 and 280 g, more preferably between 250 and 270 g.

In a further variant, the layer structure comprising abrasion layer, optionally intumescent layer and barrier layer is laminated, concealed, bonded or needled.

As indicated above, the flame protection fabric has antimicrobial properties. Thus, the layers of the flame protection fabric, in particular the abrasion layer and barrier layer, can be provided with at least one (silver-free) antimicrobial agent, such as pyrithione. For this purpose, for example, an aqueous pyrithione dispersion with a pH value between 6.5-8.5 can be introduced into the textile fabrics. It is also possible to introduce at least two antimicrobially active substances, such as a pyrithione and a thiabendazole, into one or all layers of the flame retardant fabric.

For this purpose, an aqueous dispersion comprising at least one thiabendazole and/or at least one pyrithione may be provided. The aqueous dispersion contains water as solvent carrier. The amount of volatile organic components in the dispersion is between 8 and 12%, preferably 10%. This dispersion is applied in an amount between 0.1-0.7%, preferably 0.4-0.5% in relation to the weight of the fabric or textile (e.g. as described further below in the case of coatings).

Also, in one embodiment, at least one cover may be provided on the top surface of the flame retardant fabric. The at least one cover may be laminated, concealed, bonded or sewn to the at least one flame protection fabric. This cover may be made of leather, artificial leather or a (haptically pleasant) decorative fabric.

It is also envisaged that the covers used for a cushion will be equipped with antimicrobial, silver-free substances. The main materials of the cover are leather, artificial leather, textile cover fabrics, foams or spacer fabrics. These can be provided or coated with an aqueous dispersion of pyrithione and thiabendazole with a pH value between 6.9-7.9.

Flame protection fabric and cover are attached to the at least one plastic pad by means of suitable fasteners. In another variant, the at least one flame protection fabric is bonded to the plastic pad and the at least one cover is fastened to the flame protection fabric by means of adhesive or fleece tapes.

This results in various design variants for the present cushion with the following layer structure (from bottom to top): cushion-flame retardant fabric; cushion-flame retardant fabric-cover.

In another preferred embodiment, the present cushion, particularly in the case of a seat cushion, comprises at least one stabilizing means embedded in the at least one pad.

The stabilizing means embedded in the cushion pad is more dimensionally stable than the plastic material of the cushion and has a high modulus of elasticity. Accordingly, the stabilizing means imparts increased mechanical stability and strength to the cushion. Another advantage of the embedded stabilizing means is its interchangeability, i.e. in the event of damage to the stabilizing means, for example, there is the possibility of removing the damaged stabilizing means and replacing it with a new part.

In one embodiment, the at least one stabilizing means comprises spaced-apart profiled support rails or support plates.

The number of support rails used is determined by the width of the cushion. Thus, in one variant, at least 2, preferably 3, support rails can be arranged in the cushion. The support rails have a preferred center-to-center spacing of 100 to 150 mm, in particular 120 mm. The edge-to-edge distance is preferably 50 to 80 mm, preferably 60 to 65 mm. For a cushion width of 450 mm, the minimum distance (center-to-center) is 100 mm.

The support rails can be curved, with a U-profile or a trapezoidal profile being particularly preferred. The wall thickness of the rails is between 0.5 mm and 5 mm, preferably between 1 and 4 mm, in particular preferably between 2 mm and 3 mm. The depth of the U-profile or trapezoidal profile is in a range between 5 and 15 mm, preferably between 10 and 12 mm.

In a particularly preferred embodiment, at least one side end of the support rail profile is provided with a rounding, i.e. a profile nose, to prevent damage to the foam by sharp edges. The profile rounding is preferably provided on the front side of the cushion (i.e. in the back of the knee), but can also be possible on both sides.

The support rails can be made of a light metal, such as aluminum, or also of a suitable plastic material. Fiber materials, such as carbon fibers or glass fibers, have also proved particularly advantageous in this case. The fibers are embedded in a resin system, such as a phenolic resin or epoxy resin. The support rails can be profiled, for example, by compression molding of fiber wet laminates or the sheet molding compound (SMC) process.

In a particularly preferred embodiment, the support rails are provided with a flame-retardant material, in particular in the form of a flame-resistant fabric, which is suitably bonded to the support rails.

A suitable fabric includes, for example, high-temperature-resistant fibers made of glass, plastic or graphite. Particularly preferred temperature-stable fibers are plastic fibers based on polypropylene, polyacrylate or polyamides such as aramids or polybenzimidazole. The latter is particularly advantageous if the support rail itself is already made of flame-resistant material; otherwise, flame-resistant fabric can also be used).

In a preferred embodiment, the flame-resistant fabric consists of several layers of fire-resistant material and compressed textiles. For example, a first layer may consist of high-temperature stable fibers, a second (middle) layer may consist of a prepreg fabric, and a third layer may again consist of high-temperature stable fibers.

Furthermore, reference is made to the above statements on the structure of the cushion and their use, which also apply here.

It is further preferred if the present cushions, in particular seat cushions, are coupled to at least one support element as part of a support frame of an aircraft seat. In particular, it is envisaged that the seat cushion is attached to the at least one support element by means of a fastening means, in particular in the form of adhesive straps or loop straps. It is also conceivable that the fastening means are already incorporated in the stabilizing means (by means of SMC or compression molding).

In one embodiment, the support element of the aircraft seat support frame comprises at least two struts or spars arranged parallel to one another. In the installed state of the seat cushion and the aircraft seat, the struts of the support element run transversely to the longitudinal direction of the aircraft; i.e. the struts of the support element run parallel to the direction of extension y and therefore parallel to the width b of the seat cushion.

BRIEF DESCRIPTION OF THE DRAWINGS

The solution is explained in more detail below with reference to the figures in the drawings.

DESCRIPTION OF THE INVENTION

Figure 1:
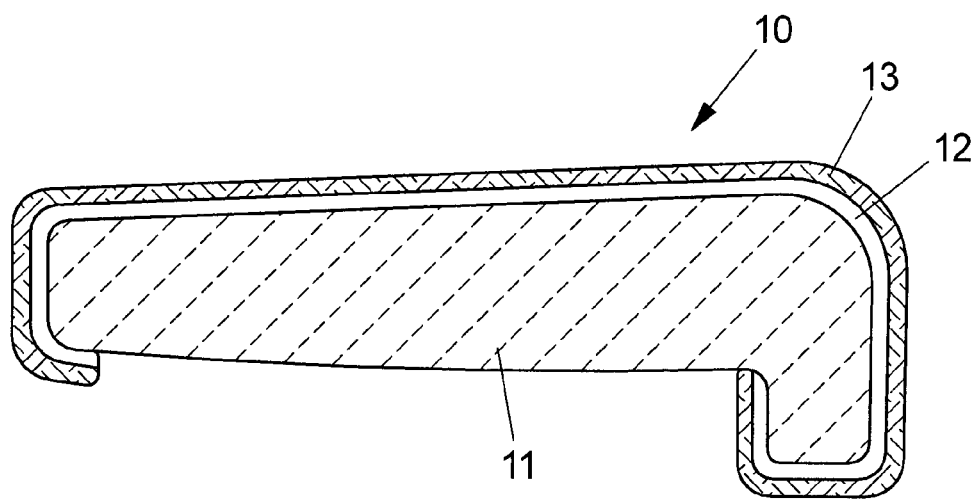
FIG. 1 shows a schematic view of a seat cushion according to the solution according to a first embodiment.

FIG. 1 shows a first embodiment of an antimicrobial seat cushion 10 for an aircraft seat. The padding 11 of the seat cushion 10 consists of a PU foam with 15 wt % thiabendazole and 15 wt % Zn-pyrithione (in each case based on the total weight of PU foam).

The pad 11 is completely surrounded by a flame protection fabric 12. A protective cover 13 is attached to the pad 11 including the flame protection fabric by means of adhesive or loop tapes. The cover 13 extends over the entire upper side of the pad including the back of the knee area.

The antimicrobial flame retardant fabric 12 comprises a barrier layer and an abrasion layer. The abrasion layer is provided on one side (here on the upper side) of the barrier layer.

The barrier layer consists of a nonwoven made of 70% Pyrotex(bi-grade) fibers (acrylonitrile fibers), 15% para-aramid fibers (regenerated) and 15% preox PAN (polyacrylonitrile) fibers. The basis weight of the barrier layer in this case is 70 g/m$^2$. The abrasion layer consists of a fabric made of 70% PAN (polyacrylonitrile) fibers and 30% para-aramid fibers. The basis weight of the abrasion layer is 130 g/m$^2$.

In addition to the barrier layer and abrasion layer, a third intumescent layer of exfoliated graphite may be provided in the flame protection fabric 12, the exfoliated graphite beginning to expand at 180° C. The exfoliated graphite layer is provided as an intermediate layer between the abrasion layer and the barrier layer. The exfoliated graphite layer is applied to the abrasion layer with a basis weight of 50 g/m$^2$.

A protective cover 13 (e.g. leather cover or fabric cover) is then attached to the structure of flame protection fabric 12 and antimicrobial padding by means of adhesive or fleece tapes.

Figure 2A:
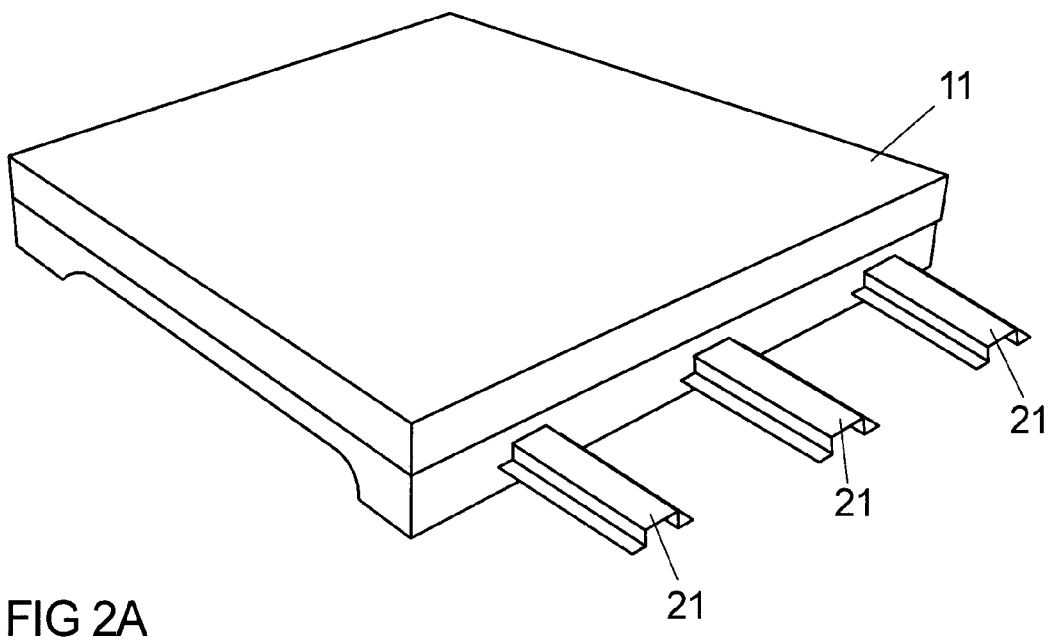
FIG. 2A shows a schematic view of a seat cushion according to the solution according to a second embodiment.

In the embodiment of the seat cushion 20 according to the solution shown in FIG. 2A, a stabilizing means in the form of U-shaped support rails 21 is provided.

The support rails 21 have a U-profile. The wall thickness of the support rails is between 1.5 and 2 mm. The support rails consist of carbon fibers or glass fibers. The fibers are embedded in a resin system, such as a phenolic resin or epoxy resin. The support rails can be profiled, for example, by compression molding of fiber wet laminates or by means of the sheet molded compound (SMC) process.

In the embodiment shown in FIG. 2A, three support rails are shown parallel with a center-to-center distance of 100 mm in a seat cushion (with a width of 450 mm). The support rails have a U-profile or a trapezoidal profile. The depth of the U-profile or trapezoidal profile is in a range between 10 and 12 mm.

Figure 2B:
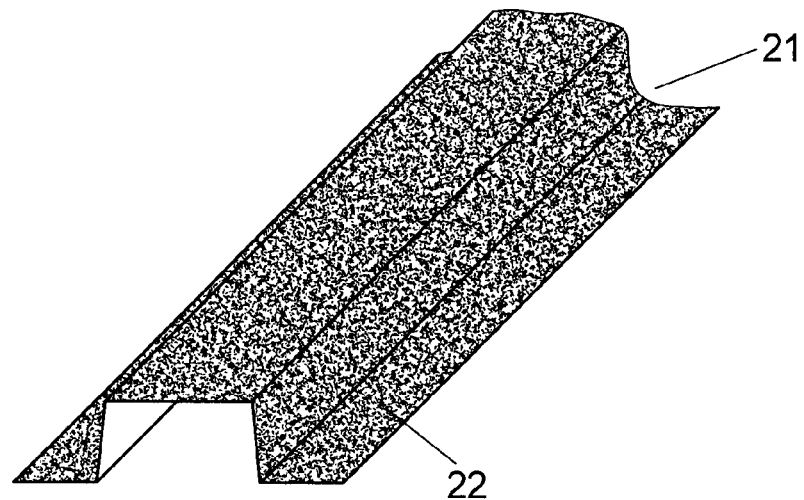
FIG. 2B shows a schematic cross-sectional view of a support rail integrated into a seat cushion of FIG. 2A.

The support rails 21 are either made of a flame-resistant material or are additionally provided with a flame-retardant material in the form of a flame-resistant fabric 22 made of temperature-stable fibers, in particular plastic fibers based on polypropylene, polyacrylate or polyamides such as aramides or polybenzimidazole. For this purpose, the support rails 21 can be laminated with the flame-resistant fabric 22 (see FIG. 2B).

Example 1: Efficacy Against *Staphylococcus aureus* ATTC 6538p

The antimicrobial activity of the pad of the solution (15 wt % thiabendazole/15 wt % Zn-pyrithione) was tested according to ISO20743:2013 (E).

For this purpose, one sample of each material (0.4±0.05 g) was placed in a Petri dish I container. Dropwise 0.2 ml of a *Staphylococcus aureus* (ATCC 6538) inoculum (Nutrient broth) was placed on the sample surface. . . . Samples were incubated at 35° C. for 24 hours. After 00, 3, 6, 12 and 24 hours, 3 samples each were transferred to 10 ml of a neutralizing liquid (EN+ neutraliser) and shaken. The number of bacteria in the resulting suspensions were quantified using dilution series on plates (TSA agar) compared to an untreated control sample. For this purpose, plates were incubated at 35° C. for 5 days and the number of colonies were counted after 2 days and 5 days.

As a result, the growth of *Staphylococcus aureus* in the treated sample was reduced by more than 99.9% after 24 h compared to the untreated control sample.

Example 2: Efficacy Against Methicillin-Resistant *Staphylococcus aureus* NCTC 13142

The sample preparation and experimental procedure are analogous to those in embodiment 1. The result showed a reduction in the growth of methicillin-resistant *Staphylococcus aureus* in the treated sample after 24 h of more than 99.9% compared to the untreated control sample.

Example 3: Efficacy Against *E. coli* DSM 1576

The sample preparation and experimental procedure are analogous to those in embodiment 1. The result showed a reduction in the growth of *E. coli* in the treated sample after 24 h of more than 99.9% compared to the untreated control sample.

The invention claimed is:

1. A cushion for an aircraft seat comprising:
   at least one antimicrobially active pad of at least one plastic material, wherein at least two antimicrobially active substances are contained in the pad, and the antimicrobially active substances do not contain silver or silver ions; and
   at least one antimicrobial flame retardant fabric covering the at least one pad,
   wherein the at least one antimicrobial flame retardant fabric covering comprises at least one barrier layer and at least one abrasion-resistant layer provided on the barrier layer, and
   the at least one barrier layer comprises 50-90 wt % acrylonitrile fibers, 5-30 wt % para-amide fibers, and 5-30 wt % pre-oxidized polyacrylonitrile fibers.

2. The cushion according to claim 1, wherein at least one of the at least two antimicrobial active substances is a thiabendazole.

3. The cushion according to claim 2, wherein the thiabendazole is present in the pad in an amount between 5 and 25% by weight.

4. The cushion according to claim 1, wherein at least one of the at least two antimicrobial active substances is a pyrithione.

5. The cushion according to claim 4, wherein the pyrithione is present in the pad in an amount between 5 and 25% by weight.

6. The cushion according to claim 1, wherein the at least two antimicrobially active substances are used in the pad in a weight ratio of between 1:5 and 5:1.

7. The cushion according to claim 1, wherein the at least one plastic material is a plastic foam.

8. The cushion according to claim 1, wherein the at least one abrasion-resistant layer comprises at least one textile material with high abrasion resistance made of at least one type of fiber.

9. The cushion according to claim 8, wherein the at least one abrasion-resistant layer comprises a textile fabric of 50 to 90% by weight of a first type of fiber and 10 to 50% by weight of a second type of fiber.

10. The cushion according to claim 1, wherein the at least one flame protection fabric has at least one intumescent layer.

11. The cushion according to claim 1, wherein at least one antimicrobially active cover is provided on an upper side of the at least one flame retardant fabric.

12. The cushion according to claim 1, further comprising at least one stabilizing means embedded in the at least one pad.

13. An aircraft seat comprising at least one cushion according to claim 1.

14. The cushion according to claim 1, wherein the at least two antimicrobially active substances are thiabendazole and pyrithione.

15. The cushion according to claim 1, wherein the abrasion-resistant layer comprises 50-90 wt % polyacrylonitrile fibers and 10-50 wt % para-amide fibers.

16. The cushion according to claim 1, further comprising a cover covering the at least one antimicrobial flame retardant fabric, wherein the cover is coated with thiabendazole and pyrithione.

17. The cushion according to claim 7, wherein the plastic foam is selected from the group consisting of polyurethane foam, polyurethane-graphite foam, polyethylene foam, polystyrene foam, polycarbonate foam, polyether foam, polyester foam, PVC foam, silicone foam, and polymethyl methacrylate (PMMA) foam.

18. The cushion according to claim 1, wherein at least one thiabendazole and at least one pyrithione are incorporated in each of the at least one barrier layer and the at least one abrasion-resistant layer.

19. A cushion for an aircraft seat comprising:
   at least one antimicrobially active pad of at least one plastic material, wherein at least two antimicrobially active substances are contained in the pad, and the antimicrobially active substances do not contain silver or silver ions; and
   at least one antimicrobial flame retardant fabric covering the at least one pad,
   wherein the at least one antimicrobial flame retardant fabric covering comprises at least one barrier layer and at least one abrasion-resistant layer provided on the barrier layer,
   the at least one barrier layer comprises 50-90 wt % acrylonitrile fibers, 5-30 wt % para-amide fibers, and 5-30 wt % pre-oxidized polyacrylonitrile fibers,
   the abrasion-resistant layer comprises 50-90 wt % polyacrylonitrile fibers and 10-50 wt % para-amide fibers, and
   wherein at least one thiabendazole and at least one pyrithione are incorporated in each of the at least one barrier layer and the at least one abrasion-resistant layer.

20. A cushion for an aircraft seat comprising:
   at least one antimicrobially active pad of at least one plastic material, wherein at least two antimicrobially active substances are contained in the pad, and the antimicrobially active substances do not contain silver or silver ions;
   at least one antimicrobial flame retardant fabric covering the at least one pad; and
   a cover covering the at least one antimicrobial flame retardant fabric,
   wherein the at least one antimicrobial flame retardant fabric covering comprises at least one barrier layer and at least one abrasion-resistant layer provided on the barrier layer,
   the at least one barrier layer comprises 50-90 wt % acrylonitrile fibers, 5-30 wt % para-amide fibers, and 5-30 wt % pre-oxidized polyacrylonitrile fibers,
   the abrasion-resistant layer comprises 50-90 wt % polyacrylonitrile fibers and 10-50 wt % para-amide fibers,
   wherein at least one thiabendazole and at least one pyrithione are incorporated in each of the at least one barrier layer and the at least one abrasion-resistant layer, and
   wherein the cover is coated with thiabendazole and pyrithione.

* * * * *